United States Patent [19]

Swedo et al.

[11] Patent Number: 5,539,014
[45] Date of Patent: Jul. 23, 1996

[54] ADHESION PROMOTERS FOR VINYL ETHER-BASED COATING SYSTEMS

[75] Inventors: Raymond J. Swedo, Mt. Prospect; George D. Green, Cary; James R. Snyder, Chicago, all of Ill.

[73] Assignee: AlliedSignal Inc., Morris Township, Morris County, N.J.

[21] Appl. No.: 293,869

[22] Filed: Aug. 19, 1994

Related U.S. Application Data

[63] Continuation-in-part of Ser. No. 274,671, Jul. 13, 1994.

[51] Int. Cl.$^6$ .................... C09J 135/08; C08F 216/12; C08F 230/08; C08F 2/50
[52] U.S. Cl. .................... 522/91; 522/96; 522/107; 522/172; 522/181; 522/103; 522/170
[58] Field of Search ..................... 522/172, 181, 522/170, 107, 103, 96, 91

[56] References Cited

U.S. PATENT DOCUMENTS

| | | | |
|---|---|---|---|
| 4,433,067 | 2/1984 | Rice et al. | 521/51 |
| 4,889,768 | 12/1989 | Yokoshima et al. | 522/91 |
| 4,932,750 | 6/1990 | Ansel et al. | 522/181 |
| 5,106,885 | 4/1992 | Liu et al. | 522/181 |
| 5,139,872 | 8/1992 | Lapin et al. | 522/181 |
| 5,312,943 | 5/1994 | Gaglani | 556/414 |
| 5,334,456 | 8/1994 | Noren et al. | 522/181 |
| 5,352,816 | 10/1994 | Takeoka | 556/420 |
| 5,384,342 | 1/1995 | Szum | 522/172 |

FOREIGN PATENT DOCUMENTS

| | | |
|---|---|---|
| 0305833A2 | 3/1989 | European Pat. Off. |
| 0511860A1 | 4/1992 | European Pat. Off. |
| 0565044A2 | 10/1993 | European Pat. Off. |
| WO93/201 | 10/1993 | WIPO |

*Primary Examiner*—Susan W. Berman
*Attorney, Agent, or Firm*—Harold N. Wells; Mary Jo Boldingh; Roger H. Criss

[57] ABSTRACT

This invention relates to vinyl ether-based coatings for which properties such as color stability, thermal stability, mechanical stability, hydrolytic stability, and resistance to embrittlement may be maintained and properties hydrogen generation and blocking are minimized. The coatings comprise a vinyl ether-containing composition polymerizable by actinic, gamma ray, or electron beam radiation comprising: (a) an oligomer or a mixture of oligomers which are monofunctional, multifunctional, or a mixture of both monofunctional and multifunctional and which have a reactive functionality chosen from the group consisting of epoxy, acrylate, vinyl ether, maleate, or mixtures thereof; (b) monomers which are monofunctional, multifunctional, or a mixture of both monofunctional and multifunctional monomers and which have a reactive functionality chosen from the group consisting of epoxy, acrylate, vinyl ether, maleate, or mixtures thereof, wherein at least one of (a) or (b) must contain a vinyl ether functionality; (c) a photoinitiator, optionally including a sensitizer, chosen from the group consisting of a cationic photoinitiator and a radical photoinitiator; and (d) a thermal oxidation stabilizer. Adhesion to a substrate, particularly glass, is achieved by coupling agents including vinyl ether urethane siloxane compounds.

7 Claims, No Drawings

ADHESION PROMOTERS FOR VINYL ETHER-BASED COATING SYSTEMS

CROSS-REFERENCE TO RELATED APPLICATIONS

This is a Continuation-in-part of U.S. Ser. No. 08/274,671 filed Jul. 13, 1994.

BACKGROUND OF THE INVENTION

This invention relates to protective or decorative vinyl ether-based coatings for wood, metal, paper, glass, and plastics where it is important to maintain certain properties such as color stability, thermal stability, mechanical stability, hydrolytic stability, and resistance to embrittlement, and to minimize or prevent other properties such as hydrogen generation and blocking.

An example of the instant invention is an optical fiber coating. Optical fibers are typically coated with a primary coating to cushion against micro-bending and a secondary coating for abrasion resistance. Problems with these coatings include long term stability, hydrogen generation, and "blocking" or fiber-fiber adhesion. Long term stability is important as the intended lifetime of optical fibers is approximately 30 years. Premature failure of the fiber coating cannot be tolerated. It is also important that degradation of the coating does not affect its surface characteristics. This could lead to surface adhesion (blocking) of the coated fibers upon later processing, or fouling of the processing equipment during manufacture. Blocking may also occur after coating because of a change in the surface energy over time. The generation of hydrogen is thought to be due to degradation of the coating. Hydrogen then reacts with the glass, resulting in a reduction in light transmission. Another concern is the adhesion (coupling) of the coating to the glass fibers.

SUMMARY OF THE INVENTION

The invention comprises improved adhesion promoters for bonding vinyl ether-based polymers to surfaces, particularly to glass as in optical fiber coatings.

Coating compositions useful with adhesion promoters of the invention comprise a vinyl ether-containing composition polymerizable by actinic, gamma ray, or electron beam radiation comprising: (a) an oligomer or a mixture of oligomers which are monofunctional, multifunctional, or a mixture of both monofunctional and multifunctional and which have a reactive functionality chosen from the group consisting of epoxy, acrylate, vinyl ether, maleate, or mixtures thereof; (b) monomers which are monofunctional, multifunctional, or a mixture of both monofunctional and multifunctional monomers and which have a reactive functionality chosen from the group consisting of epoxy, acrylate, vinyl ether, maleate, or mixtures thereof, wherein at least one of (a) or (b) must contain a vinyl ether functionality; (c) a photoinitiator with an optional sensitizer.

Additives may be used individually or as part of a stabilizer package to provide desirable properties to the coatings. These additives are thermal oxidation stabilizers, hydrogen stabilizers, light screens, color stabilizers, blocking stabilizers, and coupling agents.

Preferred coupling agents (adhesion promoters) are vinyl ether urethane siloxanes, either alone or in combination with conventional trialkoxy silanes.

In one aspect, the invention is a method of improving the adhesion of vinyl ether-based polymers to surfaces, particularly to glass fibers.

DETAILED DESCRIPTION OF THE INVENTION

The stabilized coating composition comprises a vinyl ether-containing composition polymerizable by actinic, gamma ray, or electron beam radiation comprising oligomers (a), monomers (b), photoinitiator and optional sensitizer (c). The composition also comprises additives comprising at least one additive chosen from the group consisting of a thermal oxidation stabilizer (c), a hydrogen stabilizer (e), a light screen (f), a color stabilizer (g), a blocking stabilizer (h), and a coupling agent (j). A detailed description of each of these components follows.

In the formulas below, where a moiety may be di, tri, or tetra valent, they are defined as, for example, alkyl, aryl, etc. which is to be understood as not implying a mono valent group, but a polyfunctional group having the general chemical nature indicated.

Oligomers (a).

Polyether Oligomers

Where the oligomers (a) are polyethers, they may be chosen from the group consisting of polyethylene glycol; polypropylene glycol; block or random copolymers of ethylene glycol and propylene glycol; multifunctional phenols which have been derivatized with ethylene oxide, propylene oxide, or random or block copolymers of ethylene and propylene oxides (e.g., 4,4'-isopropylidene diphenol extended with ethylene oxide); and polytetramethylene glycol. Where the oligomer is a polycarbonate, it may be chosen from the group consisting of poly(hexamethylene carbonate), poly(bisphenol-A carbonate), carbonates derived from multifunctional phenols which have been derivatized with ethylene oxide, propylene oxide, or random or block copolymers of ethylene and propylene oxides. Where the oligomer is a polyalkylene oxide, the oligomer may be chosen from the group consisting of polyethylene oxide, polypropylene oxide, polytetramethylene oxide, and random or block copolymers of thereof.

Urethane Oligomers

Where the oligomer comprises a urethane, the hydroxyl-terminated macropolyols (i) used to make the oligomer (a) may be chosen from the group consisting of polyester, polyether, polycarbonate, polyalkylene oxides, and diols of alkylene, arylene, aralkylene and cycloalkylene radicals. An example of the polyester structure is:

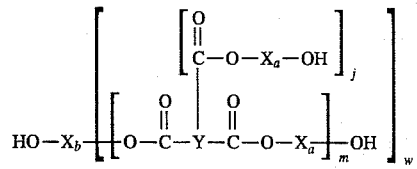

wherein $X_a$, $X_b$, and Y are radicals having a molecular weight of from 25 to about 500, and $X_b$, each $X_a$, and each Y is independently selected from the group consisting of alkyl, aryl, aralkyl and cycloalkyl radicals, j is an integer from 0 to 2, m is an integer from 1 to 100, and w is an integer from 1 to 3. Note that in the instant application, the term "independently selected" means that where there may be more than one variable within brackets which may be substituted, that variable may be selected independently of the same variable within the same brackets, e.g., the two X's in [—O—X—O—]₂, may differ from each other.

Examples of the alkyl moieties for $X_a$, $X_b$, and Y which may be used include saturated aliphatic hydrocarbons based upon methylene (>C<), ethylene (>C—C<), propylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, and eicosylene as well as unsaturated hydrocarbons such as "ethene" (>C=C<), propene, etc., preferably those alkylene groups, containing up to about 20 carbon atoms. Examples of aryl groups include phenylene, naphthylene, anthrylene, phenanthrylene, etc. Cycloalkyl groups include the cyclopentylene, cyclohexylene, cycloheptylene, cyclooctylene, and cycloalkylene groups containing 1 or more alkyl groups on the nucleus. Similarly, the aryl groups which may be used for Y also may contain one or more alkyl groups on the aromatic ring, especially where such alkyl groups contain up to about 6 carbon atoms. Examples of aralkyl groups include benzylene, 1-phenethylene, 2-phenethylene, 3-phenylpropylene, 2-phenylpropylene, 1-phenylpropylene, etc. Particularly useful Y groups are —(CH₂)ₙ— groups where n is 2, 3, or 4, 1,2-, 1,3-, or 1,4-phenylene groups, and 1,4-cyclohexylene groups. Particularly useful X groups are —CH₂CH₂—, —CH₂CH₂—O—CH₂CH₂—, —CH₂(CH₃)CH—, —(CH₂)ₙ— where n is 4 or 6, —CH₂—(CH₃)₂C—CH₂—, 1,4-phenylene, and 1,2-, 1,3-, and 1,4-xylylene.

Preferred structures for $X_a$ and $X_b$ are:

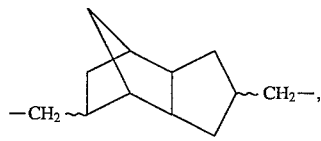

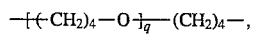

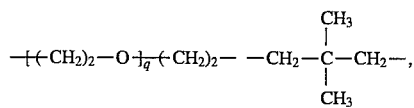

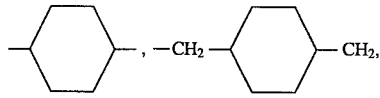

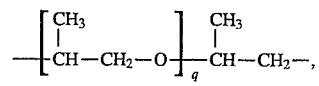

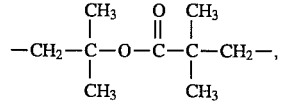

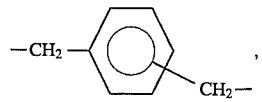

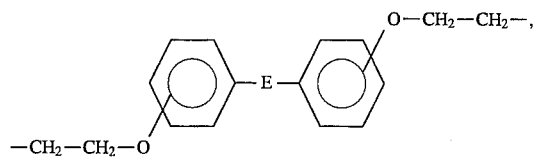

and $X_b$ may additionally be chosen from the group consisting of:

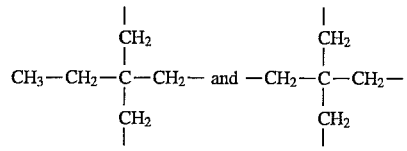

wherein n is an integer from 2 to 20, q is an integer from 0 to 40, E is chosen from the group consisting of bond, O, CH₂, S, SO₂, >C(CH₃)₂, and >C(CF₃)₂, and Y is independently selected from the group consisting of:

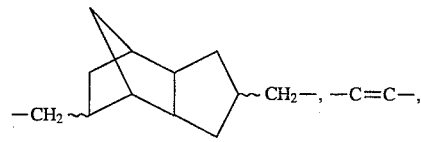

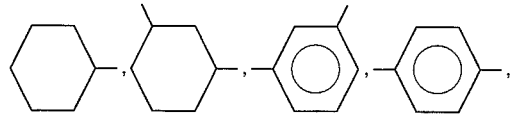

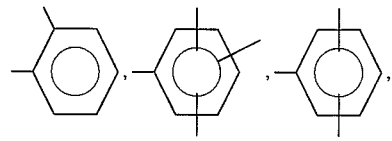

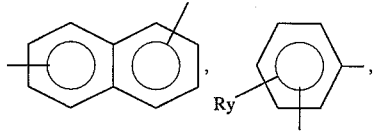

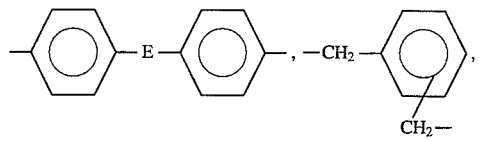

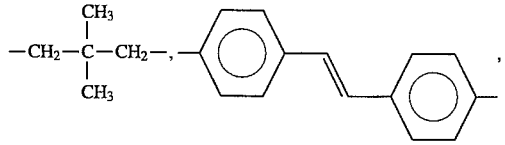

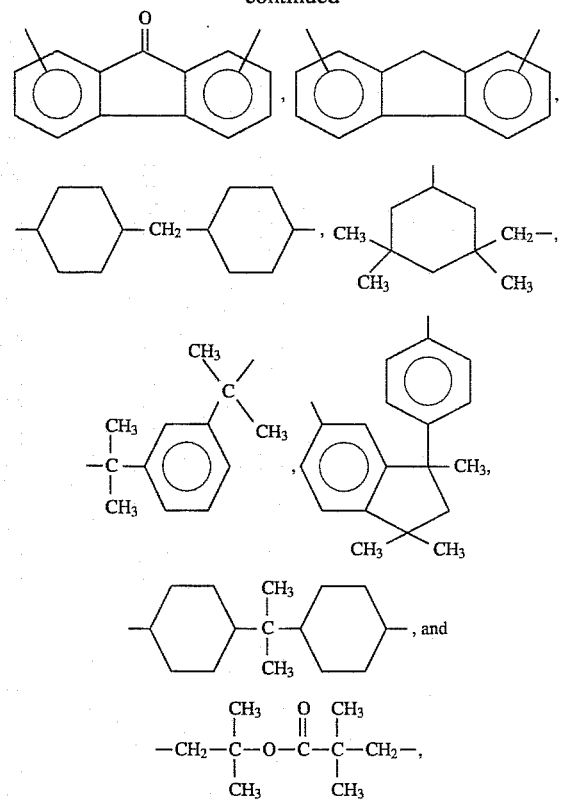

wherein n' is an integer between 2 and 20, E is chosen from the group consisting of bond, O, $CH_2$, S, $SO_2$, $>C(CH_3)_2$, and $>C(CF_3)_2$, and $R_y$ is chosen from the group consisting of alkyl containing from 1 to 6 carbon atoms, and $NO_2$.

Particularly preferred hydroxyl-terminated polyesters include poly(propylene adipate), poly(neopentyl adipate), poly(1,4-butane adipate), poly(1,6-hexane adipate), poly(neopentyl isophthalate), and poly(1,6-hexane isophthalate). The preferred molecular weights for the polyesters will be about 200 to 5000. Polyesters derived from mixed diols or acids may be useful.

Examples of the macropolyol (i) as a hydroxyl-terminated compound are:

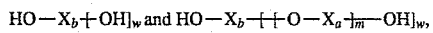

wherein $X_a$ and $X_b$ are radicals having a molecular weight of from 25 to about 500, and each $X_a$ and $X_b$ is independently selected from the group consisting of alkyl, aryl, aralkyl and cycloalkyl radicals, m is an integer from 0 to 100, preferably from 1 to 10, and w is an integer from 1 to 3. Preferred structures for $X_a$ and $X_b$ are the same as those listed for the polyester (i) above.

The diisocyanate (ii) component of the oligomer (a) has the structure:

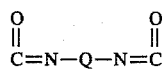

wherein Q is a divalent radical selected from the group consisting of alkylene, arylene, aralkylene, and cycloalkylene radicals.

A broad variety of diisocyanates may be used and may be exemplified by such materials as the toluene diisocyanates (TDI), p- and m-phenylene diisocyanate, 1,4-tetramethylene diisocyanate, 1,6-hexamethylene diisocyanate, 2,2,4-trimethylhexamethylene diisocyanate, 1,4-cyclohexane diisocyanate, 4,4'-dicyclo-hexylmethane diisocyanate (Desmodur W), 4,4'-diphenylmethane diisocyanate (MDI), 3,3'-dimethyl-4,4-diphenylmethane diisocyanate, 1,5-tetrahydronaphthalene diisocyanate, naphthalene-1,5'-diisocyanate, bis(2-methyl-3-isocyanatephenyl)methane, 4,4'-diphenylpropane diisocyanate, tetramethylxylene diisocyanate (TMXDI), isophorone diisocyanate (IPDI).

Polyisocyanates with a functionality of 2 or more may also be utilized. Examples are those discussed in U.S. Pat. No. 4,433,067, especially the polyisocyanates based on methylenediphenyl diisocyanate, in particular, the 4,4'-isomer and the uretonimine modified MDI as described there. The term polyisocyanate also includes quasi prepolymers of polyisocyanates with active hydrogen containing materials where the polyisocyanate is typically reacted with from about 0.05 to about 0.3 equivalents of a polyol. Although a vast number of polyisocyanates are suitable, in practice polyisocyanates based on MDI and TDI may be preferred for economy and general availability. However, aliphatic isocyanates exhibit non-yellowing properties which are especially important for coatings.

Among the most desirable isocyanates are 4,4'-diphenylmethane diisocyanate, toluene diisocyanate, isophorone diisocyanate, m-tetramethylxylene diisocyanate, 4,4'-dicyclohexylmethane diisocyanate (Desmodur W), and 1,6-hexamethylene diisocyanate.

Preferred structures for Q are:

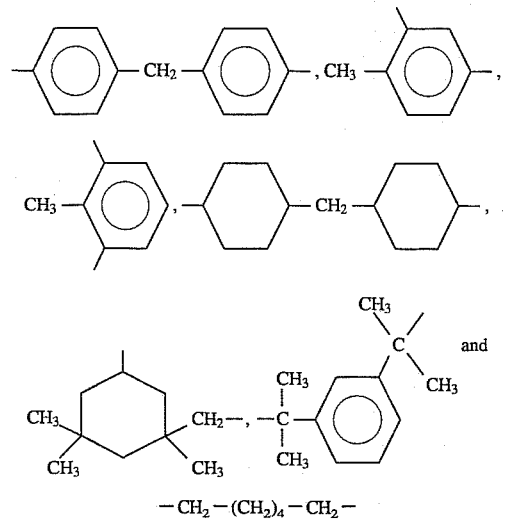

The hydroxy-containing functional group polymerizable by actinic, gamma ray, or electron beam radiation (iii) is chosen from the group consisting of epoxy, acrylate, vinyl ether, maleate, or mixtures thereof. Examples of hydroxyl-functionalized epoxides are 1-hydroxy-2,3-epoxy propane and hydroxymethylcyclohexane-3,4-oxide. Examples of hydroxy-functionalized acrylates are hydroxyethyl acrylate, hydroxypropyl acrylate, and other hydroxyalkyl acrylates. Examples of hydroxy-functionalized maleates are bis-hydroxyethyl maleate and other bis-hydroxylalkyl maleates, methyl-2-hydroxymethyl maleate, ethyl-2-hydroxymethyl maleate, and other alkylhydroxyethyl maleates.

When the hydroxy-containing functional group polymerizable by actinic, gamma ray, or electron beam radiation (iii) component of the oligomer (a) is a vinyl ether, it will have the structure:

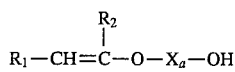

$$R_1-CH=C(R_2)-O-X_a-OH$$

wherein $R_1$ and $R_2$ are monovalent radicals selected from the group consisting of hydrogen and alkyl groups having 1 to 10 carbon atoms, preferably from 1 to 4 carbon atoms. It is preferable that both $R_1$ and $R_2$ are not alkyl moieties, for in the case where both are lower alkyl groups this causes an undesirable reduction in polymerization rate of the oligomers of our invention. Where $R_1$ is an alkyl moiety it is preferred that $R_2$ be hydrogen, and conversely, where $R_1$ is hydrogen then $R_2$ should be an alkyl of 1 to 4 carbons. In a preferred embodiment either $R_1$ or $R_2$ is a methyl group and the other is hydrogen. In a still more preferred embodiment both $R_1$ and $R_2$ are hydrogen.

$X_a$ is a divalent radical having a molecular weight in the range of from 25 to about 500 and is independently selected from the group consisting of alkylene, arylene, aralkylene and cycloalkylene radicals. The hydroxy monovinyl ether (iii) can be viewed as the adduct of an alkyne and a diol and may be prepared in that way. However, they can also be made in other ways, and the method of producing them is not part of this invention. The alkyne has the generic formula $R_1C\equiv CR_2$, and the diol has the generic formula HO—X—OH.

Examples of the diols are alkylene glycols, $HO(C_nH_{2n})OH$, where n is an integer from 2 to about 10. The linear alkylene glycols, $HO(CH_2)_nOH$, (polymethylenediols), where n is an integer from 2 to about 10, are particularly useful, especially where n is from 2 to about 6. Illustrative of the members of this group are such diols as ethylene glycol, 1,3- propylene glycol, 1,4-butanediol, 1,5-pentanediol, 1,6-hexanediol, 1,7-heptanediol, 1,8-octanediol, 1,9-nonanediol, and 1,10- decanediol (decamethylene glycol).

The nonlinear or branched alkylene diols may also be used, where such glycols contain from 3 up to about 10 carbon atoms. Examples include 1,2-propylene glycol, 2,3-butanediol, 2,3-dimethyl-2,3-butanediol, 2,3-dimethyl-1,4-butanediol, 2,2- dimethyl-1,3-propanediol(neopentylglycol).

Another useful class of diols are the polyalkylene glycols, especially poly(ethylene) glycols, $HO[-CH_2CH_2O-]_mOH$, and poly(propylene) glycol, $HO[-CH(CH_3)CH_2O]_mOH$, where m is an integer from 1 up through about 50, although more usually m is an integer from 1 up to about 10, and most preferably from 1 up to about 5. Examples of these glycols include diethylene glycol, triethylene glycol, tetraethylene glycol, pentaethylene glycol, hexaethylene glycol, etc., along with the analogs of the propylene glycols.

Of particular importance is the case where $X_a$ is a divalent radical whose parent is a cycloalkane, such as cyclopentane, cyclohexane, cycloheptane, or cyclooctane, preferably the bis-hydroxy alkyl derivatives. The preferred diols are the 1,3-bis(hydroxyalkyl)cyclopentanes and the 1,4-bis-(hydroxyalkyl)cyclohexanes, -cycloheptanes, and -cyclooctanes, particularly the cyclohexanes. Diols substituted at positions different from those specified above may be used in the practice of this invention, but not necessarily with equivalent results. The bis-(hydroxymethyl)cyclohexanes are preferred as they are readily available from the reduction of the corresponding phthalic acids, and among these 1,4-bis-(hydroxymethyl)cyclohexane is favored.

Of the hydroxy monovinyl ethers (iii) which are produced by the reaction of acetylene with the diols described above, those which are especially preferred include 4-hydroxybutyl vinyl ether (HBVE), 4-hydroxymethyl cyclohexylmethyl vinyl ether (CHMVE), 2-hydroxy ethyl vinyl ether, triethylene glycol monovinyl ether, and diethylene glycol monovinyl ether.

Preferred structures for $X_a$ are the same as those listed for the polyester (i) above.

The urethane oligomer (a) may be formed by reacting the hydroxyl-terminated macropolyol (i) with the isocyanate compound (ii) or by reacting the isocyanate (ii) with the hydroxy-containing functional group polymerizable by actinic, gamma ray, or electron beam radiation (iii) and thereafter reacting the adduct with the remaining component or alternatively, the three components may be co-reacted. The ratios of (i), (ii), and (iii) will be chosen so that the ratio of the total number of hydroxyl groups from (i) and (iii) to the number of isocyanate groups from (ii) is about 1:1. The ratio of the number of hydroxyl groups from (i) to the number of hydroxyl groups from (iii) should be in the range from about 0.5 to 10.

An important characteristic of urethane oligomers (a) is that in all cases there are few hydroxyl groups derived from the macropolyol (i) or hydroxy-containing functional group polymerizable by actinic, gamma ray, or electron beam radiation (iii) in the final product. That is, less than about 10% of the initial hydroxyl groups remain unreacted. It is most preferable that the oligomeric product contain no detectable free hydroxyl groups, i.e., less than about 1% of the initial hydroxyl groups of the reactant mixture remain unreacted. It is also important that there should be essentially no free isocyanate groups remaining in the product, that is, less than about 1% of the initial isocyanate groups of the reactant mixture.

The reaction may be carded out at temperatures in the range of 0° C. to 150° C. Solvents such as diethyl ether, methylene chloride, or toluene may be employed and later removed from the oligomers, or the components may be reacted in the absence of solvents. Divinyl ether monomers such as 1,4-cyclohexane dimethanol divinyl ether or triethylene glycol divinyl ether may also be used as solvents. Such compounds may be obtained as by-products in the preparation of hydroxy monovinyl ethers. Since they have no free hydroxyl groups they do not react with the isocyanates, but may remain with the oligomers in the formulations of coatings.

The reaction may be carried out without a catalyst, however, any of the conventional catalysts may be used, e.g., dibutyl tin dilaurate.

Polyester Oligomers

Where the oligomer (a) comprises a polyester, it is the reaction product of (i) a polyol containing at least two terminal and/or pendant hydroxyl groups, (ii) a polybasic ester, and (iii) a hydroxy-containing functional group polymerizable by actinic, gamma ray, or electron beam radiation chosen from the group consisting of epoxy, aerylate, vinyl ether, maleate, or mixtures thereof. Examples of the polyol (i) structure are the hydroxyl-terminated polyether:

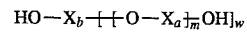

$$HO-X_b-[+O-X_a]_m^-OH]_w$$

wherein $X_a$ and $X_b$ are radicals having a molecular weight of from 25 to about 500, and each $X_a$ and $X_b$ is independently selected from the group consisting of alkyl, aryl, aralkyl and cycloalkyl radicals, m is an integer from 0 to 100, preferably 0 to 10, and w is an integer from 1 to 3 indicating the number of additional substituents of $X_b$. Preferred structures for $X_a$ and $X_b$ are the same as those listed for the polyester (iii) below.

An example of the polybasic ester (ii) structure is:

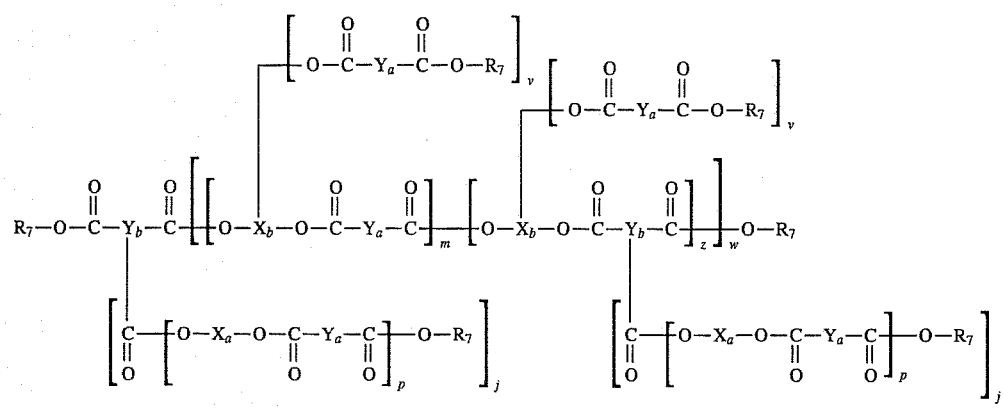

wherein $R_7$ is chosen from the group consisting of phenyl and an alkyl group containing from 1 to 6 carbons, $X_a$, $X_b$, $Y_a$, and $Y_b$ are radicals having a molecular weight of from 25 to about 500, each $X_a$, each $X_b$, each $Y_a$, and $Y_b$ being independently selected from the group consisting of alkyl, aryl, aralkyl and cycloalkyl radicals, j, z, p, v, and w are integers from 0 to 2, and m is an integer from 0 to 100, preferably 0 to 10. Preferred structures for $X_a$ are independently selected from the group consisting of:

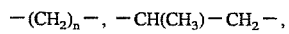

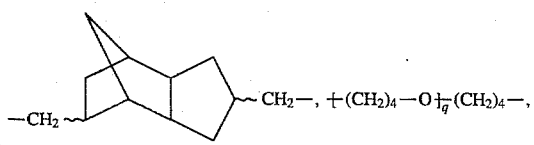

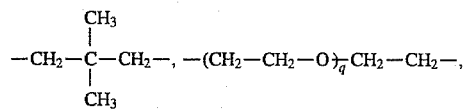

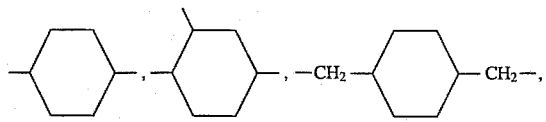

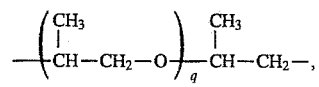

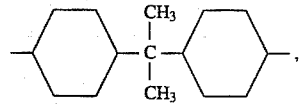

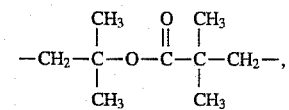

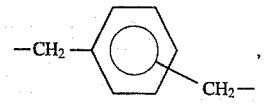

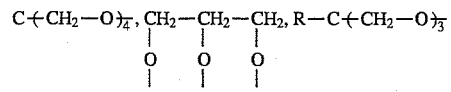

wherein q is an integer from 0 to 40, n is an integer from 2 to 20, E is chosen from the group consisting of bond, O, $CH_2$, S, $SO_2$, $>C(CH_3)_2$, and $>C(CF_3)_2$.

The preferred structure for $X_b$ are those for $X_a$ where V is 0 and where $X_b$ is polyfunctional

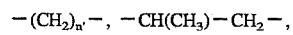

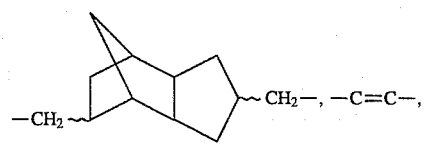

where R is 1–10 carbon alkyl.

Preferred structures for $Y_a$ and $Y_b$ are those independently selected from the group consisting of:

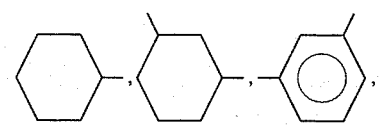

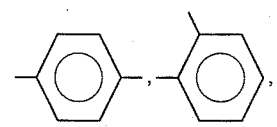

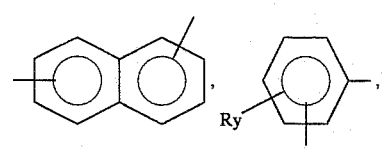

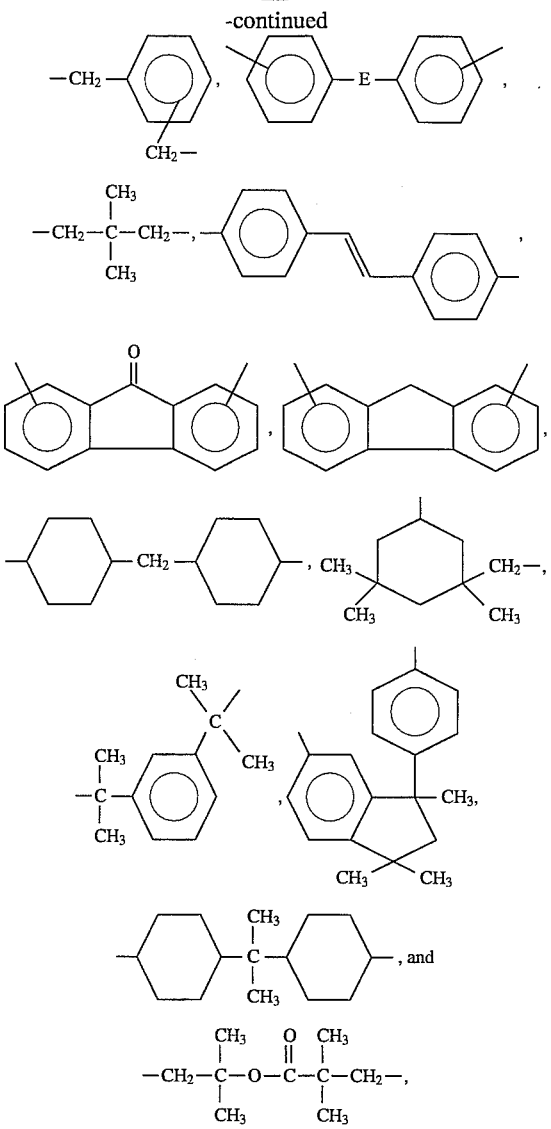

wherein n' is an integer between 0 and 20, E is chosen from the group consisting of bond, O, $CH_2$, S, $SO_2$, $>C(CH_3)_2$, and $>C(CF_3)_2$, and $R_y$ is chosen from the group consisting of alkyl containing from 1 to 6 carbon atoms, and $NO_2$, and $Y_b$ may additionally be chosen from the group consisting of:

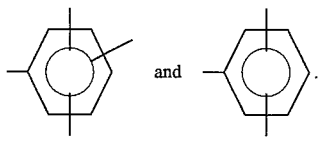

Examples of the hydroxy-containing functional group (iii) are 1-hydroxy-2,3-epoxy propane, hydroxymethylcyclohexane-3,4-oxide, hydroxyethyl acrylate, hydroxypropyl acrylate, bis-hydroxyethyl maleate, methyl-2-hydroxymethyl maleate, and ethyl-2-hydroxymethyl maleate. Examples of the structure of (iii) are:

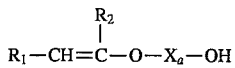

wherein $R_1$ and $R_2$ are monovalent radicals selected from the group consisting of hydrogen and alkyl groups having 1 to 10 carbon atoms. Preferably, $R_1$ is an alkyl group having 1 to 4 carbon atoms and $R_2$ is hydrogen or $R_1$ is hydrogen and $R_2$ is an alkyl group having 1 to 4 carbon atoms. Most preferably, both $R_1$ and $R_2$ are hydrogen. $X_a$ is a divalent radical having a molecular weight in the range of from 25 to about 500 and is independently selected from the group consisting of alkylene, cycloalkylene, and alkylene ether radicals. Preferred structures for $X_a$ are the same as those listed for the polyester (ii) above.

Monomers (b). In addition to the oligomer, the fiber optic coating of the instant invention also comprises monomers (b) which may be monofunctional monomers, multifunctional monomers, or a mixture of both monofunctional and multifunctional monomers. The monomers have a reactive functionality chosen from the group consisting of epoxy, acrylate, vinyl ether, maleate, or mixtures thereof, wherein at least one of (a) or (b) must contain a vinyl ether functionality. An example of a vinyl ether terminated ester monomer is:

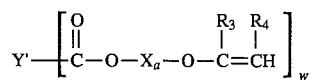

wherein w is an integer from 1 to 4 indicating the number of substitutents of Y', Y' is a mono-, di-, tri-, or tetrafunctional radical having a molecular weight of 15 to 500 and is independently selected from the group consisting of alkyl, aryl, aralkyl, and cycloalkyl radicals, $X_a$ is a divalent radical having a molecular weight of 25 to 500, each $X_a$ being independently selected from the group consisting of alkylene or cycloalkylene radicals, and $R_3$ and $R_4$ are monovalent radicals which are independently selected from the group consisting of hydrogen and alkyl groups having 1–10 carbon atoms, preferably independently selected from the group consisting of hydrogen and methyl. Y' is preferably selected from the group consisting of:

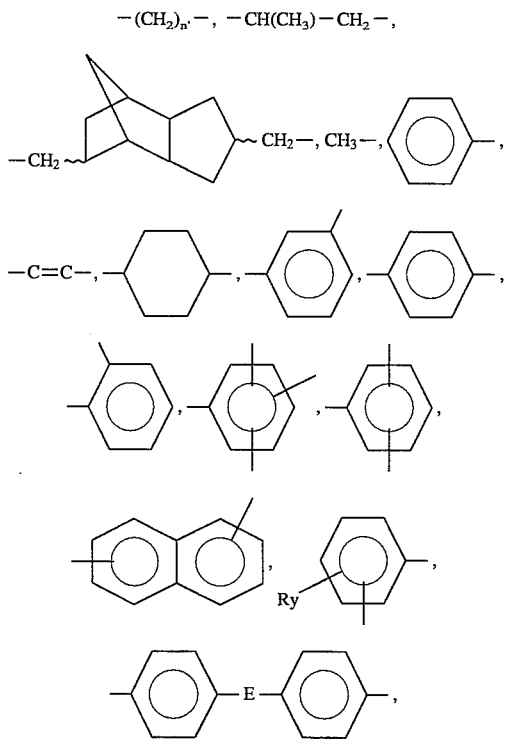

-continued

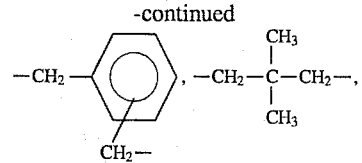

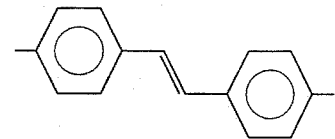

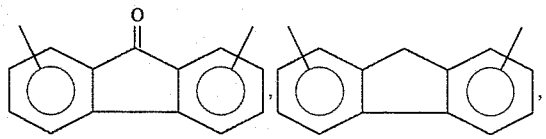

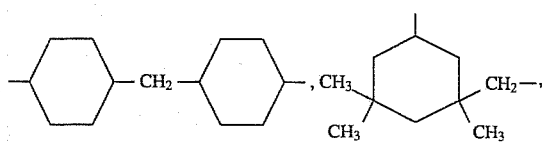

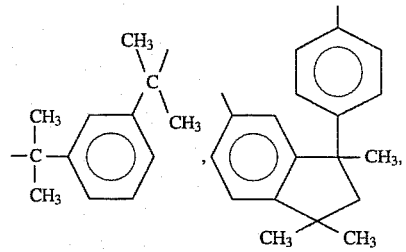

and

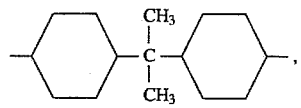

wherein n' is an integer between 2 and 20, E is chosen from the group consisting of bond, O, $CH_2$, S, $SO_2$, $>C(CH_3)_2$, and $>C(CF_3)_2$, and $R_y$ is chosen from the group consisting of alkyl containing from 1 to 6 carbon atoms, and $NO_2$. Preferred structures for $X_a$ are the same as those listed for the polyester (ii) above.

An example of a vinyl ether terminated ether monomer is:

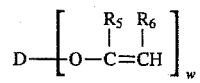

wherein w is an integer from 1 to 4 indicating the number of substituents of D, $R_5$ and $R_6$ are monovalent radicals which are independently selected from the group consisting of hydrogen and alkyl groups having 1–10 carbon atoms, preferably independently selected from the group consisting of hydrogen and methyl, and D is a mono-, di-, tri-, or tetravalent radical consisting of alkylene, cycloalkylene, or alkylene ethers having a molecular weight of 56 to 1000.

Preferred structures for D are:

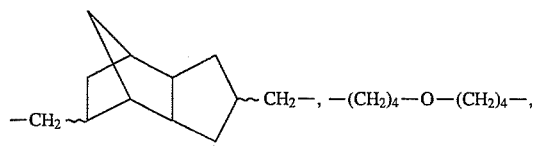

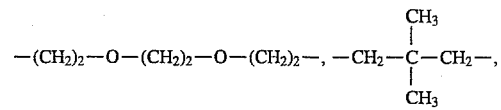

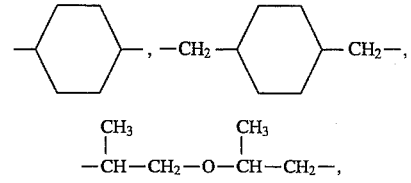

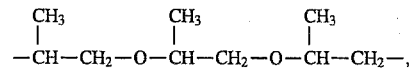

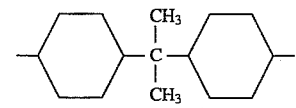

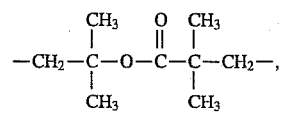

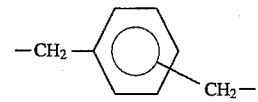

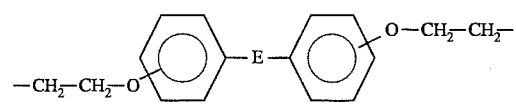

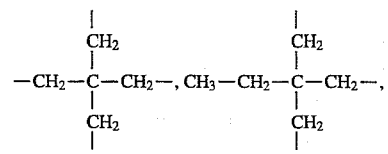

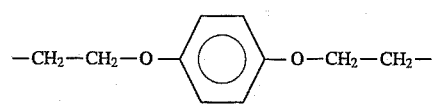

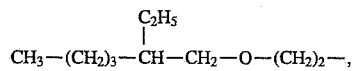

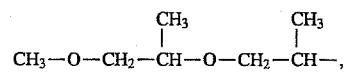

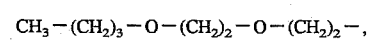

-continued $$CH_3-O-(CH_2)_2-O-(CH_2)_2-,$$

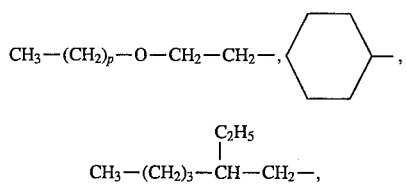

$$CH_3-(CH_2)_p-O-CH_2-CH_2-,$$

$$CH_3-(CH_2)_3-\underset{\underset{C_2H_5}{|}}{CH}-CH_2-,$$

wherein n" is an integer from 1 to 8, p is the integer 3, 4, or 5, and E is chosen from the group consisting of bond, O, $CH_2$, S, $SO_2$, $>C(CH_3)_2$, and $>C(CF_3)_2$, and wherein the tricyclic structure above includes all stereoisomers. Typical divinyl ether compounds of particular usefulness are 1,4-cyclohexane dimethanol divinyl ether, dipropylene glycol divinyl ether, tripropylene glycol divinyl ether, triethylene glycol divinyl ether.

Such compounds may be prepared conveniently by reacting acetylene with diols such as 1,4-cyclohexane dimethanol, dipropylene glycol, tripropylene glycol, and diethylene glycol.

Monofunctional compounds may also be used and these may be prepared by reacting acetylene with monoalcohols such as cyclohexanol, diethylene glycol monobutyl ether, ethylene glycol monohexyl ether, dipropylene glycol monomethyl ether, and ethylene glycol-2-ethyl hexyl ether.

Typical monofunctional vinyl ethers include cyclohexyl vinyl ether, n-butyldiethoxy vinyl ether, n-hexylethoxy vinyl ether, methyl dipropylene glycol vinyl ether, and 2-ethylhexylethoxy vinyl ether.

Photoinitiator (c). The photoinitiator (c) which may be chosen from the group consisting of a cationic photoinitiator and a radical photoinitiator, may be added with a sensitizer if necessary. Examples of cationic photoinitiators are triarylsulfonium salts or diaryliodonium salts having non-nucleophilic anions such as hexafluorophosphate (also known as Cyracure UVI-6990), hexafluoroantimonate (also known as UVI-6974), tetrafluoroborate, and hexafluoroarsenate. Examples of radical photoinitiators are benzoin ethers, acyl phosphine oxides, acyl ketals, and other radical photoinitiators known in the art. The photoinitiators are usually required in amounts from about 0.1 to 5 wt. % in the blended formula of vinyl ethers and may comprise mixtures of different triarylsulfonium or diaryliodonium salts having different non-nucleophilic anions associated with them. Examples of sensitizers are benzophenone, thioxanthone, phenanthrene, anthracenemethanol, isopropylthioxanthone, and perylene. Radiation activated cationic initiators have been reviewed by J. V. Crivello, *Advances in Polymer Sci,* 64, pp. 1–48 (1984).

Thermal Oxidation Stabilizer (d). The thermal oxidation stabilizer may be present in the coating in an amount up to about 5 wt. %, preferably in the range of from about 0.25 wt. % to about 3.0 wt. %. Examples are hindered phenolic antioxidants such as octadecyl 3-(3',5'-di-tert-butyl-4'-hydroxyphenyl)propionate (Irganox 1076), tetrakis [methylene (3,5-di-tert-butyl-4-hydroxyhydrocinnamate)]methane (Irganox 1010), and benzene propanoic acid, 3,5-bis(1,1-dimethylethyl)-4-hydroxy-,thiodi-2,1-ethanediyl ester (Irganox 1035). Examples of stabilizers which are not hindered phenolic antioxidants are N,N'-(2-naphthyl)-phenylenediamine (AgeRite White), dilaurylthiodiproprionate (Irganox PS800), and p,p'-2-(2-phenylpropyldiphenylamine (Naugard 445).

Hydrogen Stabilizer (e). The generation of hydrogen by polymers is a problem which is especially acute in coatings for optical fibers since the hydrogen can react with the surface of the glass fibers and create signal attenuation. Consequently, standards for hydrogen generation are very stringent.

Preferably, the amount of hydrogen generated in a high temperature test to be described below is 1.0 μL/g of polymer or lower, particularly 0.3 μL/g or below. The reason hydrogen generation occurs is not fully understood at this time. We believe that the hydrogen generation process involves the presence of hydroperoxide intermediates formed by the reaction of the organic compounds present in the coatings with oxygen. This may be accelerated by the radicals generated by decomposition of the photoinitiators during curing of the coating formulations. We believe that the three classes of compounds discussed below all have the effect of destroying hydroperoxides and/or trapping radicals and consequently limit the decomposition reactions which result in hydrogen formation.

In our co-pending parent application we disclosed that a group of hydrogen stabilizers are useful. In particular, hindered phenolic antioxidants, nitrogen-based stabilizers, aliphatic sulfides, aliphatic disulfides, aliphatic polysulfides, aromatic sulfides, aromatic disulfides, aromatic polysulfides, mixed aliphatic/aromatic sulfides, mixed aliphatic/ aromatic disulfides, mixed aliphatic/aromatic polysulfides, aliphatic nitro compounds, and aromatic nitro compounds.

We have now found that another class of compounds should also be included, namely transition metal salts or complexes of organic compounds, and further that when these later compounds are combined with organic sulfides or disulfides and hindered phenols marked reduction in the hydrogen generation is obtained. When the use of these three synergistic materials is combined with low radiation doses and elevated temperatures the cured polymers are able to achieve the very low levels of hydrogen generation required for optical fiber coatings, or in any other service where hydrogen generation is a concern. The benefits of these discoveries will be demonstrated in the examples below.

As previously mentioned, examples of hindered phenolic antioxidants are Irganox 1076 (octadecyl 3-(3',5'-di-tert-butyl-4-hydroxyphenyl)propionate, Irganox 1010 (tetrakis [methylene (3,5-di-tert-butyl-4-hydroxyhydrocinnamate)] methane, and Irganox 1035 (benzene propionic acid, 3,5-bis(1,1-dimethylethyl)-4-hydroxy-,thiodi-2,1-ethanediyl ester. Examples of aliphatic sulfides are dodecyl sulfide, octyl sulfide, octadecyl sulfide, sec-octylsulfide, t-butyl sulfide, dilaurylthiodiproprionate. Examples of aliphatic disulfides are dodecyl disulfide, octyl disulfide, octadecyl disulfide, sec-octyl disulfide, t-butyl disulfide, and dilaurylthiodipropionate. Examples of aromatic sulfides are phenyl sulfide, benzyl sulfide, tolyl sulfide, and 6-hydroxynaphthyl sulfide. Examples of aromatic disulfides are phenyl disulfide, benzyl disulfide, tolyl disulfide, and 6-hydroxynaphthyl disulfide.

The transitional metal salts of organic compounds are generally the metal salts of organic acids, such as acetic acid, 2-ethylhexanoic acid, naphthoic acid, cyclohexane buryrio acid, or complexes, such as acetylacetonate or arene complexes. Compounds which have been found to be useful include metal salts of naphthenate ottoate, 2-ethyl hexanoate, and cyclohexane butyrate. The transition metals of particular usefulness include cobalt, manganese, copper, nickel, and zinc.

The amounts of hydrogen stabilizers required are small, generally less than 5 wt. % in the polymer formulation before it is cured. The hindered phenols and sulfides are used in amounts of about 0 to 5 wt. %, preferably about 0.1 to 3 wt. %. The transition metal salts are usually used in smaller quantities, generally about 0.0001 to 0.5 wt. %, preferably about 0.001 to 0.05 wt. %.

Light Screen (f). The light screen may be present in the coating at a range of 0 to 5 wt. %. Examples of light screens include benzotriazole derivatives and aromatic esters such as Cyasorb 2908 (2,6-di(t-butyl)-p-hydroxybenzoic acid, hexadecyl ester), aryl salicylate esters, and esters of 2-cyano-3, 3-diphenyl-acrylic acid.

Color Stabilizer (g). The color stabilizer may be present in the coating at a range of 0 to 5 wt. %. Examples of color stabilizers are carbamates such as N,N'-dicarbomethoxybenzidine and blocked amines such as Tinuvin 440 (8-acetyl-3-dodecyl-7,7,9,9-tetramethyl-1,3,8-triazaspiro(4,5)decane-2,4-dione).

Blocking Stabilizer (h). The blocking stabilizer is present in the coating at a range of 0 to 5 wt. %. Examples of blocking stabilizers are carnauba wax, polyether silicone copolymers such as SF 1188, fluorinated copolymers, micronized polyethylene waxes, and micronized celluloses.

Coupling Agent (j). In the parent of this application typical coupling agents were reported to be substituted trialkoxy silanes. While these silanes are used to improve the adhesion of polymers to glass, they have been found to fall short of the desired performance for premium applications such as for optical fiber coatings, especially where water or high humidity are present. There are other disadvantages to the use of the trialkoxy silanes. First, they are relatively volatile and have an unpleasant odor. Also, it is necessary to use undesirably large amounts in order to obtain adequate coupling of the polymers to glass. Finally, these coupling agents have a tendency to reduce the curing speed of the coating formulations, which is clearly undesirable.

We have now found that vinyl ether urethane siloxanes provide improved coupling agents. These compounds generally have lower volatility and less odor than the trialkoxy silanes used heretofore. By having vinyl ether groups, they are easily compatible with the vinyl ether coating formulations. In addition, and most important they are more effective than the trialkoxy silanes under moist conditions.

The new vinyl ether urethane siloxane coupling agents may be produced by the reaction of hydroxy monovinyl ethers with trialkoxy silanes which have an isocyanate functionality. Typical but not limiting monovinyl ethers are 4-hydroxybutyl vinyl ether, 2-hydroxyethyl vinyl ether, hydroxymethyl cyclohexyl methyl vinyl ether, 6-hydroxyhexyl vinyl ether and diethylene glycol mono vinyl ether. Isocyanate functionalized silanes include for example, isocyanatopropyl triethoxysilane.

Coating Preparation. Protective or decorative vinyl ether-based coatings for wood, metal, paper, glass, and plastics should maintain properties such as color stability, thermal stability, mechanical stability, hydrolytic stability, and resistance to embrittlement, and to minimize or prevent other properties such as hydrogen generation and blocking.

One such application requiring maintenance of such properties is the use of these coatings in optical fiber preparation. Optical coatings are sometimes applied in two layers, the inner being much different in physical properties than the outer. The inner or primary coating is softer and more elastic than the outer or secondary coating, which is intended to provide a tough barrier able to protect the inner coating and the glass fiber beneath it. Although the formulations used by the present inventors for the inner and outer coatings are selected from the same families of vinyl ether compounds, quite different properties can be obtained. Also, it is an advantage to the formulator that both layers are chemically related in that cure, weltability, and adhesion are improved. The formulations are prepared so that they have a viscosity of about 100 to 1000 cps (mPa.s) at the application temperature (about 20° to 100° C.). The cured coating requires physical properties consistent with their function. For the primary layer the glass transition temperature (Tg) should be at or below 0° C. and have a modulus of 80–800 psi (551–5510 kPa) at room temperature with an elongation greater than 50%. The secondary layer should have a cured Tg greater than 50° C., a cured modulus of at least 50,000 psi (344.7 MPa) at room temperature and an elongation greater than 5%.

In general, a primary optical fiber coating comprises a vinyl ether-containing composition polymerizable by actinic, gamma ray, or electron beam radiation. This composition comprises a resin mixture, a photoinitiator, a thermal oxidation stabilizer, and additives, said resin mixture comprising oligomer (a) and monomers (b), wherein oligomer (a) comprises from about 5 to 95 wt % of the resin mixture and monomers (b) comprise about 5 to 95 wt % of the resin mixture, and wherein the amounts of the remaining components are based upon the resin mixture: the photoinitator (c) comprises from about 0.1 to 5 wt % based upon the weight of the resin mixture, the thermal oxidation stabilizer (d) comprises 0.1 to 5 pph, and the additives are the hydrogen stabilizer of the invention (e) comprising 0 to 5 pph, a light screen (f) comprising 0 to 5 pph, a color stabilizer (g) comprising 0 to 5 pph, and a coupling agent (adhesion promoter of the invention) (j) comprising 0 to 5 pph.

A secondary optical fiber coating comprises a vinyl ether-containing composition polymerizable by actinic, gamma ray, or electron beam radiation. This composition comprises a resin mixture, a photoinitiator, a thermal oxidation stabilizer, and additives, said resin mixture comprising oligomer (a) and monomers (b), wherein oligomer (a) comprises from about 5 to 95 wt % of the resin mixture, monomers (b) comprise about 5 to 95 wt % of the resin mixture, and wherein the mounts of the remaining components are based upon the resin mixture: the photoinitiator (c) comprises from about 0.1 to 5 wt % based upon the weight of the resin mixture, the thermal oxidation stabilizer (d) comprises 0.1 to 5 pph, and the additives are a hydrogen stabilizer (e) comprising 0 to 5 pph, a light screen (f) comprising 0 to 5 pph, a color stabilizer (g) comprising 0 to 5 pph, and a blocking stabilizer (h) comprising 0 to 5 pph.

The coatings and the oligomers are cured using actinic, gamma ray, or electron beam radiation. Electron beam curing may be performed advantageously in the presence of an iodonium or a sulfonium salt to afford high speed cationic polymerization. Ultraviolet curing in the presence of an onium salt also may be used to produce cationic polymerization. The ultraviolet radiation from a mercury vapor lamp is commonly used. Other means include thermal curing in the presence of a Lewis acid, such as boron trifluoride, or in the presence of a strong acid such as p-toluenesulfonic acid and trifluoromethylsulfonic acid. Latent thermal catalysts which release a strong acid upon heating, e.g., blocked sulfonic acid may also be used. All these methods of polymerization are well known to those skilled in the art. Cationic polymerization in the presence of ultraviolet radiation is preferred for curing of the comings for optical fibers. Curing by radical polymerization may be induced by electron, gamma, or actinic radiation. Curing of a mixed vinyl ether/acrylate or vinyl ether maleate system in the presence of a radical initiator may be performed by ultraviolet, electron beam, or gamma irradiation. A dual initiator system, i.e., having both radical and cationic initiators, can also be used.

EXAMPLE I

A polyester oligomer based upon a polyol and diester was made with the stoichiometry controlled such that the oligomer was ester end-capped and of the appropriate molecular weight. A second stage was then performed in which hydroxyvinyl ether was added to end-cap the ester moieties.

The polyester oligomer was synthesized as follows: A 250 mL high temperature polycondensation flask equipped with a short path distillation sidearm was charged with 4,8-bis(hydroxymethyl)tricyclo-[5.2.1.0$^{2,6}$]decane (BHTD, 39.26 g, 0.2 mol), dimethyl isophthalate (D/VII) (58.26 g, 0.3 mol) and titaniumdiisopropoxide acetylacetonate catalyst (10 drops). The flask was fitted with a mechanical stirrer and vacuum applied (23.9 kPa, 180 torr). The mixture was stirred at 140° C. for 180 minutes during which time methanol (9.8 g, 77% theory) distilled from the reaction. The reactor vacuum was dropped to <667 Pa (<5 torr) over 120 minutes during which time an additional 2.4 g methanol was collected (95% theory). Hydroxybutylvinyl ether (HBVE, 35 g, 0.3 mol) was added to the reaction mass and stirring at 140° C./12 kPa (90 torr) was continued for 70 minutes. The vacuum was subsequently lowered to 5.3 kPa (40 torr) over 45 minutes. A total of 6.3 g methanol distilled during the HBVE condensation stage (98% theory). The vacuum was lowered to <667 Pa (<5 torr) and excess HBVE removed. A total of 11.5 g HBVE (98% theory) was recovered. The mixture was cooled to room temperature and used without purification. FTIR shows no OH stretch and gel permeation chromatography (GPC) (ethyl acetate solvent, polystyrene standards with UV detection at 270 nm, flow rate was 1.0 mL/min at 35° C., refractive index (RI) detection) gave molecular weights of Mn=2,183, Mw=2,268. using four columns with 5 μm diameter particles having pore sizes of 50Å, 100Å, 500Å, and 1000Å, respectively. HNMR analysis indicated no acetal formation.

EXAMPLE II

Testing Combinations of Hydrogen Stabilizers

The polyester oligomer of Example I was mixed with Vectomer 4010 in a 60/40 weight ratio to make a formulation useful in optical fiber coatings. The photoinitiator, UVI-6974 was added in amounts varying from 0.25 pph to 0.8 pph. Hydrogen stabilizers selected from hindered phenols, organic sulfides and disulfides and transition metal salts were added to determine their effect, singly and in combinations.

The formulations were applied to glass plates using a 1.5 mil (0.035 mm) Byrd bar. Then the coated plates were heated to the desired curing temperature in an air-circulating oven and cured by exposure to UV light in a nitrogen atmosphere using RPC Model QC-1202 UV processor (Fusion Systems 300 watt/inch H bulbs). The total exposure was controlled by varying the conveyer speed and thus the time of exposure.

After curing, approximately 1 gram of each cured resin was removed from the glass plate, weighed to the nearest 10$^{-4}$ gram, placed into a 20 mL glass vial (I-Chem), and sealed with a plastic screw cap fitted with a silicone rubber septum for gas sampling. The vials with film samples were then heated at 100° C. in an air circulating oven for 24 hours. After removing the samples from the oven, and allowing them to cool, the amount of hydrogen generated was determined by GC head space analyses of the vials.

Hydrogen analyses were conducted using an HP 5890 gas chromatograph with thermal conductivity detector. The column used was a 6 ft×⅛ in OD (0.085 in ID) stainless steel column packed with 80/100 mesh 13× molecular sieve (Alltech Associates C-5000). Analyses were conducted isothermally at 31° C., with He as the carder gas.

The detector response was calibrated by injecting measured volumes of pure hydrogen gas via a gas tight syringe, then plotting response against hydrogen volume.

Head space analyses of the resin sample vials were conducted by injecting 500 μL of head space gas via a gas into the gas chromatograph using a gas tight syringe. The amount of hydrogen gas generated by the resin sample was then determined by the following formula:

$$[H_2], \mu L/g = \frac{\text{(calibration curve slope)} \times \text{(resin sample } H_2 \text{ response)} + \text{(calibration intercept)}}{\text{(weight of coating sample)}}$$

EXAMPLE III

Testing Transitional Metal Salts

The procedures and formulations of Example II were used to compare several combinations of a hindered phenol, a disulfide, and a transition metal salt.

TABLE I

| Example # | PTDS$^A$, ppm | Irganox 1076$^B$, ppm | CuHex$^C$, ppm | Hydrogen Generated μL/Gram |
|---|---|---|---|---|
| 1 | — | — | — | 74.69 |
| 2 | — | 1.0 | — | 16.24 |
| 18 | — | — | 0.1 | 2.51 |
| 19 | — | 1.0 | 0.1 | 3.85 |
| 20 | 1.0 | — | 0.1 | 1.00$^D$ |
| 21 | 0.5 | 1.0 | 0.1 | 1.40 |
| 22 | 1.0 | 1.0 | 0.01 | 1.09 |

$^A$PTDS is p-tolyl disulfide.
$^B$Irganox 1076 is octadecyl 3-(3',5'-di-tert-butyl-4'-hydroxyphenol)propionate from Ciba-Geigy
$^C$CuHex is copper (II) 2-ethylhexanoate.
$^D$Formulation required 2 × 300 MJ/cm$^2$ to cure.

These results show that the composition of the stabilizer package is a key factor in determining its effectiveness in inhibiting the formation of hydrogen in vinyl ether formulations. Soluble copper salts are seen to be effective in reducing hydrogen generation even when used as the sole additive (Sample 18). The combination of the copper salt with Irganox 1076 is not as effective as the combination of copper salt with p-tolyl disulfide (Samples 19 and 20). Synergistic properties are achieved by combining the copper salt with the Irganox 1076 and the p-tolyl disulfide (Samples 21 and 22). The effectiveness of the copper salt is seen even at very low copper concentrations (Sample 22).

EXAMPLE IV

Effect of UV Dose

The formulations and procedures of Example II were repeated with the amount of UV exposure (dose) varied. The results are given the following table.

TABLE 2

| Sample | Organic Disulfide Type | Organic Disulfide PPM | Irganox 1076[A] PPM | CuHex[B] PPM | Dose mJ/cm² | Hydrogen Generated μL/gram |
|---|---|---|---|---|---|---|
| 1 | — | — | — | — | 300 | 74.69 |
| 2 | — | — | 1.0 | — | 300 | 16.24 |
| 23 | — | — | 3.0 | — | 100 | 35.01 |
| 24 | TDS[C] | 1.0 | 1.0 | 0.01 | 300 | 1.09 |
| 25 | TDS[C] | 0.5 | 1.0 | 0.1 | 300 | 1.40 |
| 26 | DDS[D] | 1.0 | 1.5 | 0.01 | 225 | 0.67 |
| 27 | DDS[D] | 0.5 | 1.0 | 0.1 | 200 | 0.54 |
| 28 | DDS[D] | 0.5 | 1.0 | 0.1 | 100 | 0.29 |
| 29 | DDS[D] | 0.5 | 1.0 | 0.1 | 50 | 0.33 |
| 30 | DDS[D] | 1.0 | 1.0 | 0.2 | 300 | 1.35 |

[A]Irganox 1076 is octadecyl 3'-(3', 5'-di-tert-butyl-4'-hydroxyphenyl)propionate from Ciba-Geigy.
[B]CuHex is copper (II) 2-ethylhexanoate.
[C]TDS is p-tolyl disulfide.
[D]DDS is dodecyl disulfide.

These results show that cure dose at room temperature is an important factor in the mount of hydrogen generated in vinyl ether formulations. However, the stabilizer package is effective in reducing hydrogen generation to low levels (ca. 1 μL/gram) even at high cure dose (300 mJ/cm²).

EXAMPLE V

Effect of UV Dose and Temperature

The formulations and procedures of Example II were repeated with both the UV exposure and curing temperature varied. The results are given in the following table.

TABLE 3

| Sample # | Organic Disulfide Type | Organic Disulfide PPM | Irganox 1076[A] PPM | CuHex[B] PPM | Temp °C. | Dose mJ/cm² | Hydrogen Generated μL/Gram |
|---|---|---|---|---|---|---|---|
| 1 | — | — | — | — | RT[D] | 300 | 74.69 |
| 2 | — | — | 1.0 | — | RT[D] | 300 | 16.24 |
| 31 | PTDS[C] | 0.5 | 1.0 | 0.1 | RT[D] | 300 | 1.40 |
| 32 | PTDS[C] | 1.0 | 1.0 | 0.1 | 60 | 100 | 0.68 |
| 33 | DDS[E] | 0.5 | 1.0 | 0.1 | RT[D] | 200 | 0.54 |
| 34 | DDS[E] | 0.5 | 1.0 | 0.1 | 60 | 50 | 0.31 |
| 35 | DDS[E] | 1.0 | 1.0 | 0.1 | 60 | 50 | 0.19 |
| 36 | DDS[E] | 1.0 | 1.0 | 0.2 | 60 | 100 | 0.70 |
| 37 | DDS[E] | 1.0 | 1.0 | 0.3 | 60 | 100 | 0.62 |

[A]Irganox 1076 is octadecyl 3-(3', 5'-di-tert-butyl-4'-hydroxyphenyl)propionate from Ciba-Geigy.
[B]CuHex is copper (II) 2-ethylhexanoate.
[C]TDS is p-tolyl disulfide.
[D]RT is ambient room temperature: 20–25°C.
[E]DDS is dodecyl disulfide.

These results show that cure dose and temperature are important factors in the amount of hydrogen generated in vinyl ether formulations. The combination of elevated curing temperature, low cure dose and the incorporation of the stabilizer package, hydrogen generation is suppressed to levels as low as 0.2 μL/gram.

EXAMPLE VI

Vinyl Ether Urethane Siloxane Coupling Agents

Three vinyl ether urethane siloxanes were made by the following method. A 100 mL 3-neck flask was equipped with a magnetic stir bar, a thermometer, and an N₂ bubbler. The flask was charged with 27.29 (0.11 moles) of 3-isocyanatopropyl triethoxysilane and 18.78 g (0.11 moles) of hydroxymethyl cyclohexylmethyl vinyl ether. The resulting mixture was stirred under N₂, and the flask was cooled in an ice bath. To the mixture were added two drops of dibutyl tin diacetate. Within a few seconds, the temperature of the mixture began to rise, reaching about 65° C. after about 10 minutes. The temperature began to decrease almost immediately. When the temperature reached about 40° C., the ice bath was removed, and the reaction mixture was stirred at room temperature for 1 hour. At this time, IR analysis showed that all of the isocyanate group had been reacted. The resulting vinyl ether urethane siloxane was a mobile liquid with a slight but pleasant odor.

Other catalysts for the generation of urethanes could be employed as well, and solvents can be used when solid reactants or products are used or anticipated.

Two additional vinyl ether urethane siloxanes were made by the same method described above using 4-hydroxy butyl vinyl ether (HBVE) and 2-hydroxy ethyl vinyl ether (HEVE).

The performance of these new adhesion promoters will be shown in the examples below.

EXAMPLE VII

Vinyl Ether Oligomers for a Glass Adhesion (Coupling) Tests

Urethanes

Two vinyl ether-capped urethane oligomers were made by methods similar to that of Example 1 and then equal weights were blended for use in mixing optical fiber coatings in the examples below.

The first oligomer was prepared by reacting 17.752 equivalents of Witco Formfez 33–56 (OH equivalent weight 1011.9) with 35.503 equivalents of BASF methylene diisocyanate (NCO equivalent weight 125.37) using dibutyltin diacetate as the catalyst, then end-capping with 17.752 equivalents of ISP CHMVE (cyclohexanedimethanol monovinyl ether, OH equivalent weight 170). The second oligomer was prepared by reacting 17.64 equivalents of Witco Formrez 33–56 (OH equivalent weight 1011.9) with 35.29 equivalents of BASF MP-102 diisocyanate (NCO equivalent weight 185.02) using dibutyltin diacetate as the catalyst, then end-capping with 17.64 equivalents of ISP CHMVE (OH equivalent weight 170). For the purposes of this investigation, equal weights of these two products were blended together. The resulting urethane oligomer blend was designated as VEU.

Esters

Two vinyl ether-capped ester oligomers were made by methods similar to that of Example 11. In this instance the two were not blended, but used individually to prepare optical fiber coatings in the examples below.

The first oligomer was prepared by the trans-esterification reaction of 22.92 moles of dimethyl isophthalate (Morflex 1129) with 17.32 moles of polyTHF-250 (BASF) and 3.05 moles of BHTD (4,8-bis(hydroxymethyl)tricyclo-[5.2.1.0$^{2,6}$]decane, Aldrich) using dibutyltin diacetate as the catalyst, followed by end-capping with HBVE (4-hydroxybutyl vinyl ether, ISP). The resulting ester oligomer was designated as VEE-1.

The second oligomer was prepared by the trans-esterification reaction of 25.02 moles of dimethyl isophthalate (Morflex 1129) with 17.41 moles of polyTHF-250 (BASF), 0.64 moles of polyTHF-650 (BASF), and 3.97 moles of BHTD (Aldrich) using dibutyltin diacetate as the catalyst, followed by end-tapping with HBVE (ISP). The resulting ester oligomer was designated as VEE-2.

EXAMPLE VIII

Optical Fiber Coatings for Glass Adhesion (Coupling) Tests

Three optical fiber coatings were formulated for adhesion testing using the urethane and ester oligomers made in Example VII. These coatings were as follows:

| COMPONENT | WT. % (PPH) |
|---|---|
| Formulation A | |
| VEU | 69 |
| PolyTHF divinyl ether[a] | 9 |
| VEX 3010[b] | 10 |
| 2-Ethylhexyl vinyl ether[c] | 12 |
| Irganox 1076[d] | (1.0) |
| UVI-6990[e] | (0.75) |
| Coupling agent (as specified) | (1.0) |
| Formulation B | |
| VEE-1 | 80 |
| VEctomer 4010[f] | 15 |
| VEX 3010[b] | 5 |
| Dodecyl sulfide | (0.5) |
| Copper(II) 2-ethylhexanoate | (0.0025) |
| Irganox 1076[d] | (2.0) |
| UVI-6974[g] | (0.8) |
| Coupling agent (as specified) | (as specified) |
| Formulation C | |
| VEE-2 | 80 |
| VEctomer 4010[f] | 15 |
| VEX 3010[b] | 5 |
| Dodecyl sulfide | (0.5) |
| Copper (II) 2-ethylhexanoate | (0.0025) |
| SF1188[h] | (0.5) |
| UVI-6974[g] | (as specified) |
| Irganox 1076[d] | (2.0) |
| Formulation D | |
| VEE-2 | 80 |
| Vectomer 4010[f] | 15 |
| VEX-3010[b] | 5 |
| UVI-6974[g] | (0.8) |

| COMPONENT | WT. % (PPH) |
|---|---|
| Coupling Agent (as specified) | (1.0) |

[a] poly tetrahydrofuran divinyl ether (ISP)
[b] reaction product of 4-hydroxy butyl vinyl ether and methyl benzoate (AlliedSignal)
[c] supplied by ISP
[d] octadecyl-3-(3',5'-ditertbutyl-4'-hydroxyphenyl)propionate (Ciba-Geigy)
[e] triaryl sulfonium hexafluorophosphate (Union Carbide)
[f] reaction product of 4-hydroxy butyl vinyl ether and dimethylisophthalate (AlliedSignal)
[g] triaryl sulfonium hexafluoro antimonate (Union Carbide)
[h] silicone fluid (Dow Corning)

In the examples below the formulations A, B, and C of Example VII were combined with a coupling agent selected from the following group and then tested for adhesion.

| | |
|---|---|
| E6250 | 2-(3,4-epoxycyclohexyl)ethyl trimethoxysilane (Huls) |
| M8550 | 3-methacryloxypropyl trimethoxysilane (Huls) |
| G6720 | 3-glycidoxypropyl trimethoxysilane (Huls) |
| G6710 | (3-glycidoxypropyl)methyl diethoxysilane (Huls) |
| A0564 | allyl triethoxysilane (Huls) |
| V4910 | vinyl triethoxysilane (Huls) |
| HBVE/Si | AlliedSignal, reaction product of 3-isocyanatopropyl triethoxysilane with 4-hydroxybutylvinyl ether |
| HEVE/Si | AlliedSignal, reaction product of 3-isocyanatopropy triethoxysilane with 2-hydroxyethylvinyl ether |
| CHMVE/Si | AlliedSignal, reaction product of 3-isocyanatopropyl triethoxysilane with cyclohexanediethanol monovinyl ether |
| HDMVE/Si | AlliedSignal reaction product of 3-isocyanatopropyl triethoxysilane with 6-hydroxyhexylvinyl ether |

Thin films (ca. 1.5 mils) of the resin formulations were applied to clean glass plates. The formulations were cured by exposure to UV light using a Fusion Systems photocuring unit with 300 watt/inch H-bulbs. The cure dose was varied as indicated in the Examples, and was controlled by varying the conveyor speed.

After the resin formulations were cured, their adhesion to the glass plates was evaluated by 180° peel testing at 10 inches/minute. The cured test plates were exposed to various environments before adhesion was evaluated:

| | |
|---|---|
| Ambient Conditions: | Samples were evaluated after allowing the cured formulations to equilibrate to ambient temperature and humidity for at least 1 day. |
| 95% RH: | Samples were evaluated after allowing the cured formulations to equilibrate in a 95% RH chamber at room temperature for at least 1 day. 38 |
| Immersion: | Samples were evaluated after being immersed in water at room temperature for the amount of time specified. |

The following examples demonstrate the effectiveness of using vinyl ether derivatized siloxane coupling agents to improve adhesion of vinyl ether based formulations to glass under a variety of environmental conditions. The effects of varying curing conditions (photocationic initiator concentration, cure dose, and cure temperature) are also explored.

These examples are not intended to be in any sense limiting as to the application of vinyl ether derivatized siloxane coupling agents. It is anticipated that this new class of coupling agents could find application to other cationically cured resin formulations—such as epoxy resins or vinyl ether maleates. It is also anticipated that these coupling agents can improve adhesion of cationically cured resin formulations to other substrates—such as metals, wood, and paper—although not necessarily with the same degree of effectiveness. Finally, it is also anticipated that these new vinyl ether derivatized siloxane coupling agents can be used in concert with other commercially available siloxane coupling agents to achieve desired adhesion properties, providing that these commercially available coupling agents do not interfere with vinyl ether curing or formulation stability.

EXAMPLE IX

Comparative

Commercially available coupling agents selected from those listed above were added (at 1 pph) to formulation A (urethane based) and cured to determine their effect on curing at ambient temperatures. The results are given in the following table.

TABLE 4

| SAMPLE | COUPLING AGENT | CURE DOSE mJ/CM² | RESULTS |
|---|---|---|---|
| 1 | (NONE) | 100 | FULLY CURED |
| 2 | (NONE) | 250 | FULLY CURED |
| 3 | (NONE) | 500 | FULLY CURED |
| 4 | E6250 | 100 | DID NOT CURE |
| 5 | E6250 | 250 | DID NOT CURE |
| 6 | E6250 | 500 | NOT FULLY CURED |
| 7 | M8550 | 100 | DID NOT CURE |
| 8 | M8550 | 250 | FULLY CURED |
| 9 | M8550 | 500 | FULLY CURED |
| 10 | G6720 | 100 | DID NOT CURE |
| 11 | G6720 | 250 | FULLY CURED (DISCOLORED) |
| 12 | G6720 | 500 | FULLY CURED (DISCOLORED) |
| 13 | G6710 | 100 | DID NOT CURE |
| 14 | G6710 | 250 | FULLY CURED (DISCOLORED) |
| 15 | A0564 | 100 | DID NOT CURE |
| 16 | A0564 | 250 | FULLY CURED |
| 17 | V4910 | 100 | DID NOT CURE |
| 18 | V4910 | 250 | FULLY CURED |

Based on the above results, it can be seen that all of the commercial coupling agents did compromise the cure speed of Formulation A at levels of 1 pph. However, only formulations containing E6250 could not be cured under any of the conditions evaluated.

EXAMPLE X

Each of the commercially available coupling agents which did not prevent curing of Formulation A at 250 mJ/cm² dose were evaluated for their effect on adhesion under ambient, 95% relative humidity, and immersion conditions as described above. In each case, the formulations were cured at 250 mJ/cm² at ambient temperature. The results are given in the following table.

TABLE 5

| | | 180° Peel Test Results (Grams/Inch) | | |
|---|---|---|---|---|
| Sample | Coupling Agent | Ambient[a] | 95% RH[b] | Immersion[c] |
| 19 | (NONE) | 135 | — | — |
| 20 | (NONE) | 120 | — | — |
| 21 | (NONE) | — | 15 | — |
| 22 | (NONE) | — | 10 | — |
| 23 | (NONE) | — | — | 5 |
| 24 | (NONE) | — | — | 5 |
| 25 | A0564 | 370 | — | — |
| 26 | A0564 | 490 | — | — |
| 27 | A0564 | — | 80 | — |
| 28 | A0564 | — | 80 | — |
| 29 | A0564 | — | — | 10 |
| 30 | A0564 | — | — | 20 |
| 31 | G6710 | 195 | — | — |
| 32 | G6710 | 785 | — | — |
| 33 | G6710 | — | 35 | — |
| 34 | G6710 | — | 145 | — |
| 35 | G6710 | — | — | 5 |
| 36 | G6710 | — | — | 45 |
| 37 | G6720 | 135 | — | — |
| 38 | G6720 | 780 | — | — |
| 39 | G6720 | — | 115 | — |
| 40 | G6720 | — | 480 | — |
| 41 | G6720 | — | — | 10 |
| 42 | G6720 | — | — | 5 |
| 43 | V4910 | 170 | — | — |
| 44 | V4910 | 210 | — | — |
| 45 | V4910 | — | 65 | — |
| 46 | V4910 | — | 80 | — |
| 47 | V4910 | — | — | 10 |
| 48 | V4910 | — | — | 10 |
| 49 | M85550 | — | 15 | — |

[a]Exposure to Ambient room conditions (temperature of 22–24° C., 42–51% RH) for 1 day prior to testing.
[b]Exposure to 95% RH at ambient room temperature for 1 day prior to testing.
[c]Testing performed after immersion in water at room temperature for 1 day.

The results of these evaluations showed that A0564 gave the most consistent improvement in adhesion. Coupling agents G6710 and G6720 gave some higher adhesion values than A0564, but the results were not as consistent. Furthermore, both G6710 and G6720 caused discoloration in the cured formulations.

EXAMPLE XI

The preferred commercial coupling agent from Example X was compared with vinyl ether urethane siloxanes of the invention. In these tests, Formulation D (ester based) was used and the samples were cured using 250 mJ/cm² radiation dose at a temperature of 60° C. The results of these tests are shown in the following table.

TABLE 6

| SAMPLE | COUPLING AGENT | RESULTS |
|---|---|---|
| 50 | (NONE) | FULLY CURED |
| 51 | HBVE/Si | FULLY CURED |
| 52 | HEVE/Si | FULLY CURED |
| 53 | CHMVE/Si | FULLY CURED |
| 54 | A0564 | FULLY CURED |
| 164 | HDMVE/Si | FULLY CURED |

The results of these studies showed that the new coupling agents, did not appear to significantly compromise the cure speed of Formulation D. Commercially available coupling agent A0564 likewise did not compromise cure speed.

EXAMPLE XII

The representative coupling agents of Example XI, A0564 and CHMVE/Si were tested for their ability to improve adhesion of Formulation B to glass. The concentration of CHMVE/Si was varied. All samples were used with 250 mJ/cm² at 60° C. The results are shown in the following table.

TABLE 7

| Sample | Coupling Agent | Level PPH | Ambient[a] | 180°Peel 95% RH[b] | Immersion[c] |
|---|---|---|---|---|---|
| 55 | (None) | | 155 | — | — |
| 56 | (None) | — | — | 5 | — |
| 57 | A0564 | 1.0 | 180 | — | — |
| 58 | A0564 | 1.0 | — | 75 | — |
| 59 | CHMVE/Si | 0.25 | 335 | — | — |
| 60 | CHMVE/Si | 0.25 | — | 75 | — |
| 61 | CHMVE/Si | 0.50 | 420 | — | — |
| 62 | CHMVE/Si | 0.50 | — | 155 | — |
| 63 | CHMVE/Si | 0.75 | — | — | 9 |
| 64 | CHMVE/Si | 0.75 | 420 | — | — |
| 65 | CHMVE/Si | 0.75 | — | 225 | — |
| 66 | CHMVE/Si | 1.0 | 425 | — | — |
| 67 | CHMVE/Si | 1.0 | — | 180 | — |
| 68 | CHMVE/Si | 1.0 | — | — | 14 |
| 69 | CHMVE/Si | 2.0 | — | — | 77 |
| 70 | CHMVE/Si | 4.0 | — | — | 132 |

[a]Exposure to Ambient room conditions (temperature of 22–24° C., 42–51% RH) for 1 day prior to testing.
[b]Exposure to 95% RH at ambient room temperature for 1 day prior to testing.
[c]Testing performed after immersion in water at room temperature for 3 days.

The results of these evaluations clearly demonstrate that the new coupling agent CHMVE/Si provided superior improvement in adhesion to glass plates compared to commercially available coupling agent A0564.

EXAMPLE XIII

The new coupling agent CHMVE/Si was tested in Formulation C at varying curing conditions using various concentrations of both the coupling agent and the photoinitiator. The results are given in the following table. The adhesion testing was carried out at ambient conditions.

TABLE 8

| Sample | CHMVE/Si Level,PPH | Initiator[a] Level,PPH | Cure Dose mJ/cm² | Temp °C. | 180° Peel Test Results Ambient[b] (Grams/Inch) 1 Day | 7 Days |
|---|---|---|---|---|---|---|
| 71 | 0 | 0.8 | 250 | 60 | 80 | — |
| 72 | 0 | 0.8 | 250 | 60 | — | 65 |
| 73 | 0.5 | 0.8 | 250 | 60 | 180 | — |
| 74 | 0.5 | 0.8 | | 60 | — | 120 |
| 75 | 1.0 | 0.8 | 250 | 60 | 215 | — |
| 76 | 1.0 | 0.8 | 250 | 60 | — | 170 |
| 77 | 2.0 | 0.8 | 250 | 60 | 280 | — |
| 78 | 2.0 | 0.8 | 250 | 60 | — | 235 |
| 79 | 3.0 | 0.8 | 250 | 60 | 220 | — |
| 80 | 3.0 | 0.8 | 250 | 60 | — | 185 |
| 81 | 4.0 | 0.8 | 250 | 60 | 290 | — |
| 82 | 4.0 | 0.8 | 250 | 60 | — | 220 |
| 83 | 0.5 | 0.8 | 250 | 100 | — | 130 |
| 84 | 2.0 | 0.8 | 250 | 100 | — | 200 |
| 85 | 0.5 | 0.4 | 150 | 100 | 475 | — |
| 86 | 0.5 | 0.4 | 150 | 100 | — | 535 |
| 87 | 2.0 | 0.4 | 150 | 100 | 420 | — |
| 88 | 2.0 | 0.4 | 150 | 100 | — | 350 |
| 89 | 3.0 | 0.4 | 150 | 100 | 555 | — |
| 90 | 3.0 | 0.4 | 150 | 100 | — | 230 |
| 91 | 0 | 0.4 | 250 | 100 | 120 | — |
| 92 | 0 | 0.4 | 250 | 100 | — | 100 |
| 93 | 0.5 | 0.4 | 250 | 100 | 205 | — |
| 94 | 0.5 | 0.4 | 250 | 100 | — | 220 |
| 95 | 1.0 | 0.4 | 250 | 100 | 420 | — |
| 96 | 1.0 | 0.4 | 250 | 100 | — | 545 |
| 97 | 2.0 | 0.4 | 250 | 100 | 380 | — |
| 98 | 2.0 | 0.4 | 250 | 100 | — | 390 |
| 99 | 3.0 | 0.4 | 250 | 100 | 190 | — |
| 100 | 3.0 | 0.4 | 250 | 100 | — | 235 |
| 101 | 4.0 | 0.4 | 250 | 100 | 265 | — |
| 102 | 4.0 | 0.4 | 250 | 100 | — | 265 |

[a]Union Carbide UVI-6974.
[b]Exposure to Ambient room conditions (temperature of 22–24° C., 42–51% RH) for number of days specified prior to testing.

The results of these samples clearly demonstrate that the incorporation of CHMVE/Si into vinyl ether based formulations improves ambient adhesion to glass under a variety of curing conditions. The best results were obtained when lower photocationic initiator levels and lower cure doses were used (Samples 85–90).

EXAMPLE XIV

Further testing was carried out using CHMVE/Si as a coupling agent using Formulation C. The adhesion was measured after water immersion. The results are shown in the following table.

TABLE 9

| Sample | CHMVE/Si Level,PPH | Initiator Level,PPH | Cure Dose mJ/cm$^2$ | Cure Temp °C. | 180° Peel Test Results Immersion[b] (Grams/Inch) | | |
|---|---|---|---|---|---|---|---|
| | | | | | 1 day | 7 days | 14 days |
| 103 | 0 | 0.8 | 250 | 60 | 0 | — | — |
| 104 | 0 | 0.8 | 250 | 60 | — | 0 | — |
| 105 | 0 | 0.8 | 250 | 60 | — | — | 5 |
| 106 | 0.5 | 0.8 | 250 | 60 | 15 | — | — |
| 107 | 0.5 | 0.8 | 250 | 60 | — | 10 | — |
| 108 | 0.5 | 0.8 | 250 | 60 | — | — | 15 |
| 109 | 1.0 | 0.8 | 250 | 60 | 15 | — | — |
| 110 | 1.0 | 0.8 | 250 | 60 | — | 10 | — |
| 111 | 1.0 | 0.8 | 250 | 60 | — | — | 10 |
| 112 | 2.0 | 0.8 | 250 | 60 | 15 | — | — |
| 113 | 2.0 | 0.8 | 250 | 60 | — | 10 | — |
| 114 | 2.0 | 0.8 | 250 | 60 | — | — | 10 |
| 115 | 3.0 | 0.8 | 250 | 60 | 20 | — | — |
| 116 | 3.0 | 0.8 | 250 | 60 | — | 5 | — |
| 117 | 3.0 | 0.8 | 250 | 60 | — | — | 10 |
| 118 | 4.0 | 0.8 | 250 | 60 | 90 | — | — |
| 119 | 4.0 | 0.8 | 250 | 60 | — | 110 | — |
| 120 | 4.0 | 0.8 | 250 | 60 | — | — | 165 |
| 121 | 0.5 | 0.8 | 250 | 100 | 50 | — | — |
| 122 | 0.5 | 0.8 | 250 | 100 | — | 35 | — |
| 123 | 0.5 | 0.8 | 250 | 100 | — | — | 30 |
| 124 | 2.0 | 0.8 | 250 | 100 | 20 | — | — |
| 125 | 2.0 | 0.8 | 250 | 100 | — | 5 | — |
| 126 | 2.0 | 0.8 | 250 | 100 | — | — | 5 |
| 127 | 0.5 | 0.4 | 150 | 100 | 430 | — | — |
| 128 | 0.5 | 0.4 | 150 | 100 | — | 470 | — |
| 129 | 0.5 | 0.4 | 150 | 100 | — | — | 515 |
| 130 | 2.0 | 0.4 | 150 | 100 | 225 | — | — |
| 131 | 2.0 | 0.4 | 150 | 100 | — | 230 | — |
| 132 | 2.0 | 0.4 | 150 | 100 | — | — | 255 |
| 133 | 3.0 | 0.4 | 150 | 100 | 110 | — | — |
| 134 | 3.0 | 0.4 | 150 | 100 | — | 130 | — |
| 135 | 3.0 | 0.4 | 150 | 100 | — | — | 300 |
| 136 | 0 | 0.4 | 250 | 100 | 20 | — | — |
| 137 | 0 | 0.4 | 250 | 100 | — | 15 | — |
| 138 | 0 | 0.4 | 250 | 100 | — | — | 10 |
| 139 | 0.5 | 0.4 | 250 | 100 | 170 | — | — |
| 140 | 0.5 | 0.4 | 250 | 100 | — | 135 | — |
| 141 | 0.5 | 0.4 | 250 | 100 | — | — | 180 |
| 142 | 1.0 | 0.4 | 250 | 100 | 140 | — | — |
| 143 | 1.0 | 0.4 | 250 | 100 | — | 155 | — |
| 144 | 1.0 | 0.4 | 250 | 100 | — | — | 110 |
| 145 | 2.0 | 0.4 | 250 | 100 | 130 | — | — |
| 146 | 2.0 | 0.4 | 250 | 100 | — | 115 | — |
| 147 | 2.0 | 0.4 | 250 | 100 | — | — | 35 |
| 148 | 3.0 | 0.4 | 250 | 100 | 75 | — | — |
| 149 | 3.0 | 0.4 | 250 | 100 | — | 70 | — |
| 150 | 3.0 | 0.4 | 250 | 100 | — | — | 60 |
| 151 | 4.0 | 0.4 | 250 | 100 | 315 | — | — |
| 152 | 4.0 | 0.4 | 250 | 100 | — | 220 | — |
| 153 | 4.0 | 0.4 | 250 | 100 | — | — | 205 |
| 154 | 0.5 | 0.4 | 500 | 100 | 60 | — | — |
| 155 | 0.5 | 0.4 | 500 | 100 | — | 40 | — |
| 156 | 1.0 | 0.4 | 500 | 100 | 10 | — | — |
| 157 | 1.0 | 0.4 | 500 | 100 | — | 25 | — |
| 158 | 2.0 | 0.4 | 500 | 100 | 10 | — | — |
| 159 | 2.0 | 0.4 | 500 | 100 | — | 100 | — |
| 160 | 3.0 | 0.4 | 500 | 100 | 10 | — | — |
| 161 | 3.0 | 0.4 | 500 | 100 | — | 30 | — |
| 162 | 4.0 | 0.4 | 500 | 100 | 55 | — | — |
| 163 | 4.0 | 0.4 | 500 | 100 | — | 40 | — |

[a]Union Carbide UVI-6974.
[b]Testing performed after immersion in water at room temperature for the number of days specified.

The results of these samples clearly demonstrate that the incorporation of CHMVE/Si into vinyl ether based formulations improves wet immersion adhesion to glass under a variety of curing conditions. The best results were obtained when lower photocationic initiator levels and lower cure doses were used (Samples 127–135).

EXAMPLE XV

Improvement in dry adhesion can be obtained as well. Two of the new coupling agents were mixed with Formulation B and cured using a radiation dose of 250 mJ/cm$^2$ at a temperature of 80° C. The results are given in the following table.

TABLE 10

| Sample | Coupling Agent | Level, pph | 180° Peel Test[a] 1 Day, Dry (grams/inch) |
|---|---|---|---|
| 55 | None | — | 155 |
| 165 | CHMVE/Si | 1.5 | 220 |
| 166 | HDMVE/Si | 1.5 | 250 |

[a] exposure to ambient conditions of 22–24° C. at 42–51% relative humidity for 1 day before testing

We claim:

1. A method of improving the coupling of a glass substrate and a radiation cured polymer consisting essentially of cured vinyl ether compounds, the precursors of said polymer comprising a vinyl ether terminated urethane or ester oligomer and a vinyl ether monomer, comprising mixing with the vinyl ether precursors of said polymer before radiation curing an effective amount of a vinyl ether urethane alkoxy silane coupling agent, coating said substrate with said mixture of vinyl ether precursors and coupling agent, and radiation curing said mixture of vinyl ether precursors and coupling agent to produce said coated substrate.

2. The method of claim 1 wherein said vinyl ether urethane alkoxy silane is the reaction product of a trialkoxy silane which has an isocyanate functionality with a hydroxy mono vinyl ether.

3. The method of claim 2 wherein said trialkoxy silane is 3-isocyanatopropyl triethoxysilane.

4. The method of claim 2 wherein said hydroxy mono vinyl ether is selected form the group consisting of 4-hydroxy butyl vinyl ether, 2-hydroxy ethyl vinyl ether, 6-hydroxyhexylvinyl ether, diethylene glycol mono vinyl ether, and hydroxy methyl cyclohexyl methyl vinyl ether.

5. The method of claim 4 wherein said hydroxy mono vinyl ether is hydroxy methyl cyclo hexyl methyl vinyl ether.

6. The method of claim 4 wherein said hydroxy mono vinyl ether is 6-hydroxyhexylvinyl ether.

7. The method of claim 6 wherein said glass is an optical fiber.

* * * * *